United States Patent
Rusher et al.

(10) Patent No.: US 8,672,388 B2
(45) Date of Patent: Mar. 18, 2014

(54) HARD ROLL-UP TONNEAU

(71) Applicant: Truxedo, Inc., Yankton, SD (US)

(72) Inventors: Ryan Rusher, Yankton, SD (US); Michael R. Spencer, Hubbard, NE (US)

(73) Assignee: Truxedo, Inc., Yankton, SD (US)

(*) Notice: Subject to any disclaimer, the term of this patent is extended or adjusted under 35 U.S.C. 154(b) by 0 days.

(21) Appl. No.: 13/649,677

(22) Filed: Oct. 11, 2012

(65) Prior Publication Data

US 2013/0093206 A1    Apr. 18, 2013

Related U.S. Application Data

(60) Provisional application No. 61/547,099, filed on Oct. 14, 2011.

(51) Int. Cl.
*B60J 11/00* (2006.01)
(52) U.S. Cl.
USPC .................................. 296/98; 296/100.09
(58) Field of Classification Search
USPC ................. 296/98, 100.09, 100.02
See application file for complete search history.

(56) References Cited

U.S. PATENT DOCUMENTS

| 4,634,172 | A | | 1/1987 | Duda |
| 5,330,246 | A | * | 7/1994 | Bernardo ............ 296/98 |
| 6,030,021 | A | * | 2/2000 | Ronai ............... 296/98 |
| 6,095,588 | A | | 8/2000 | Rodosta |
| 6,113,176 | A | | 9/2000 | Bernardo |
| 6,568,732 | B2 | * | 5/2003 | De Gaillard ........ 296/24.43 |
| 6,893,072 | B1 | * | 5/2005 | Graves ............. 296/100.12 |
| 2010/0019529 | A1 | | 1/2010 | Alston |
| 2010/0140973 | A1 | | 6/2010 | Duncan |
| 2011/0062744 | A1 | * | 3/2011 | Schrader et al. ...... 296/100.18 |

OTHER PUBLICATIONS

International Search Report and Written Opinion dated Mar. 18, 2013 from corresponding International Patent Application Serial No. PCT/US2012/060064 (eight pages).

* cited by examiner

*Primary Examiner* — Joseph Pape
*Assistant Examiner* — Dana Ivey
(74) *Attorney, Agent, or Firm* — Harness, Dickey & Pierce, P.L.C.

(57) ABSTRACT

A tonneau system for a pickup bed comprising a bracket system connectable with a sidewall of the pickup bed and a plurality of hingeable sections pivotally coupled to each other to define a continuous surface. Each of the plurality of hingeable sections being connected to adjacent hingeable sections to permit at least some of the plurality of hingeable sections to be rolled together into a generally circular cross-section to selectively reveal the pickup bed.

5 Claims, 10 Drawing Sheets

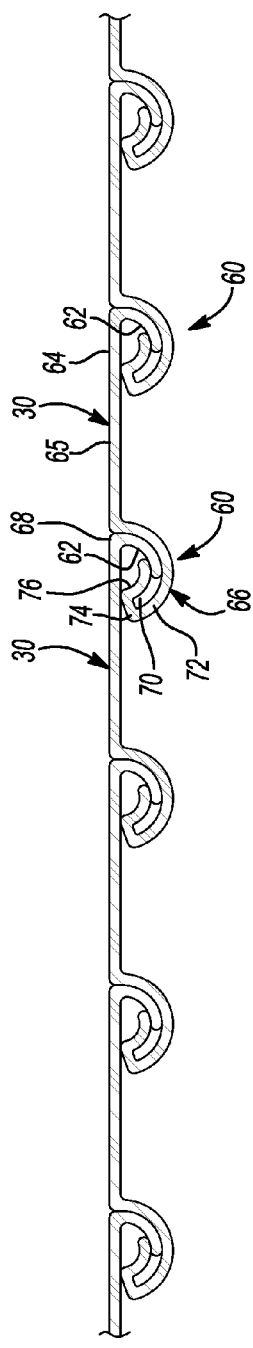
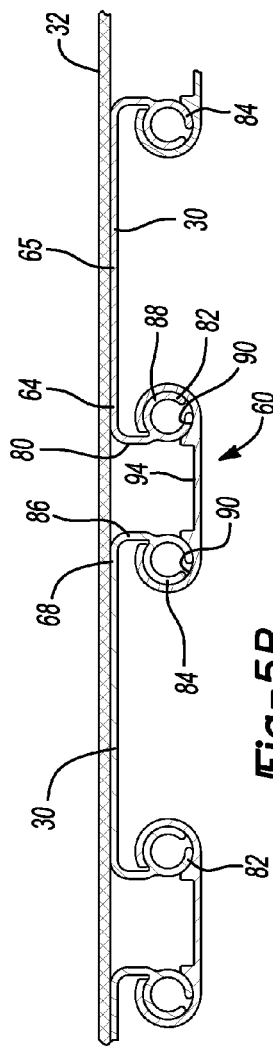
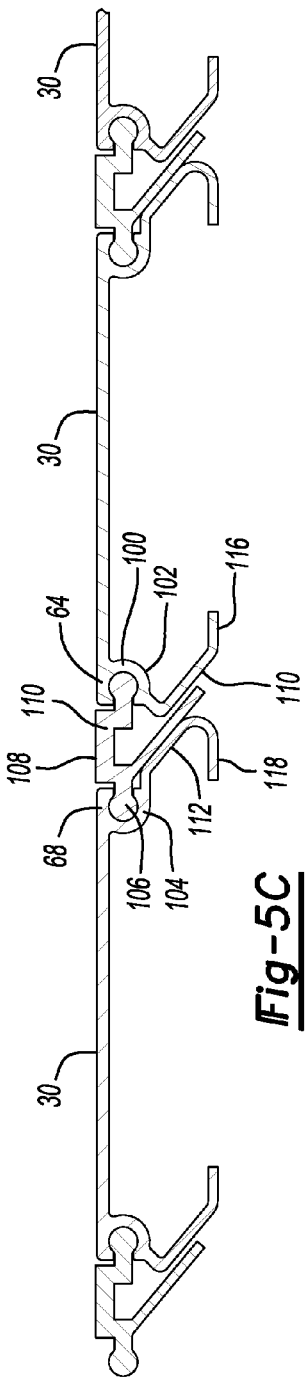

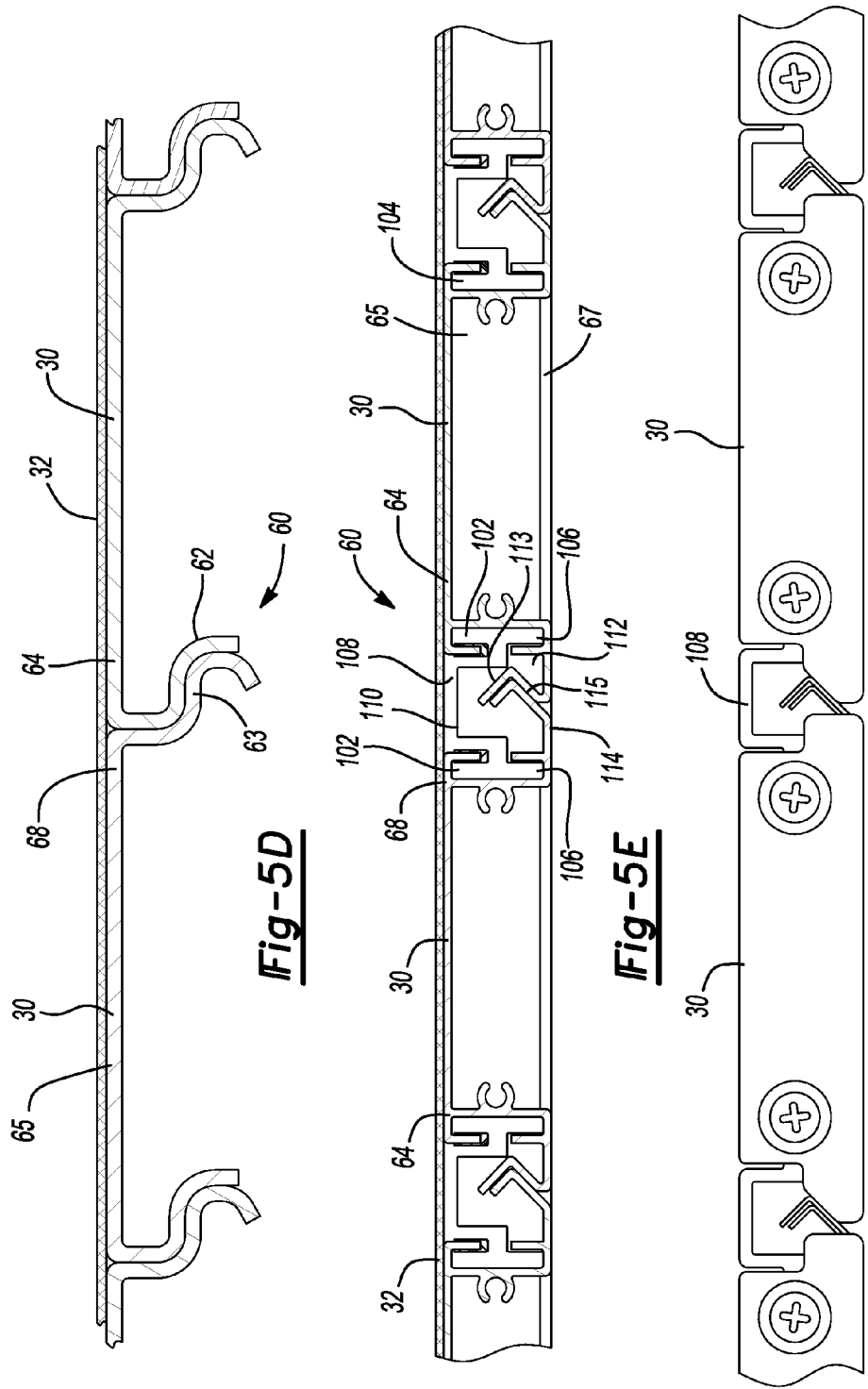

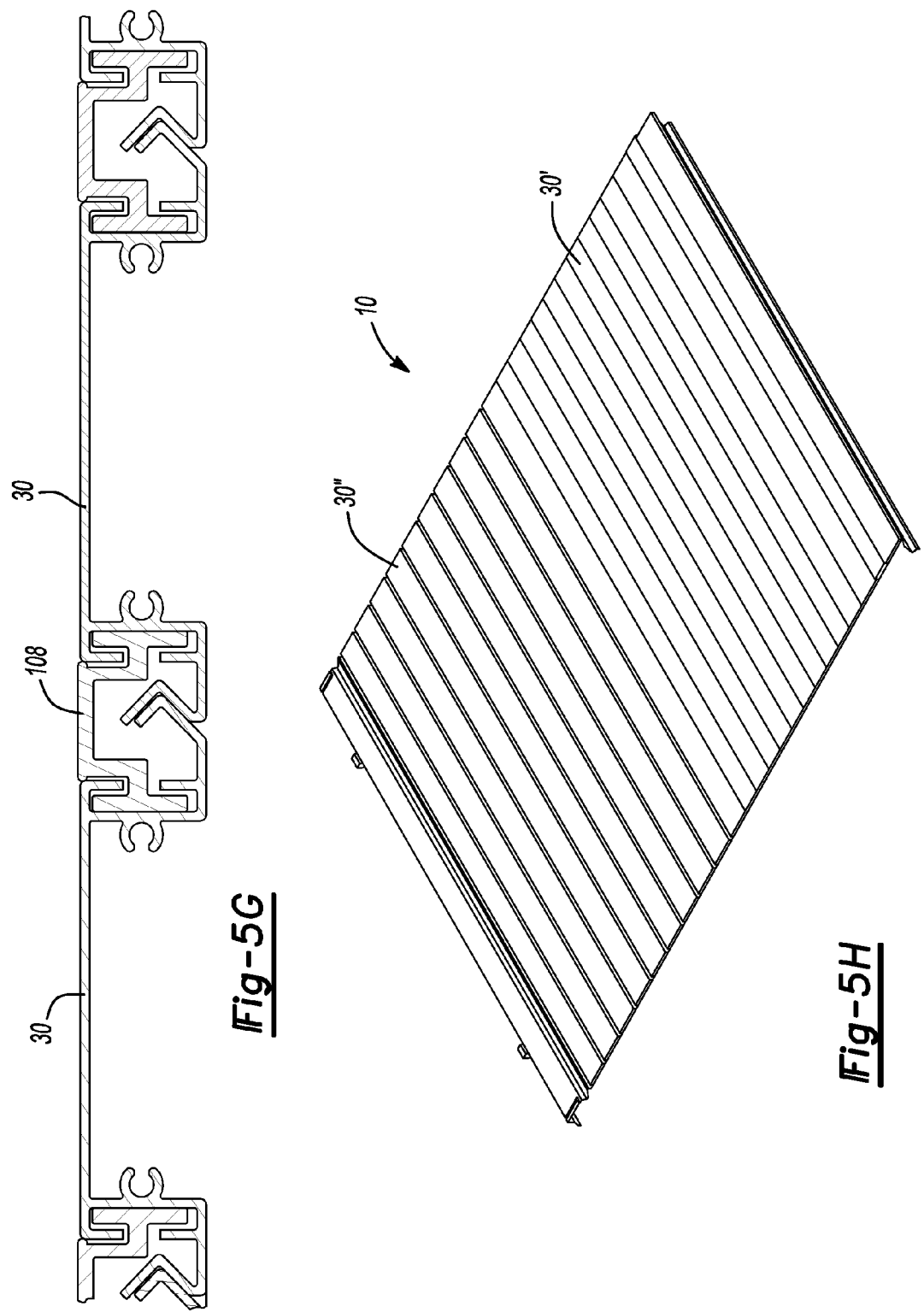

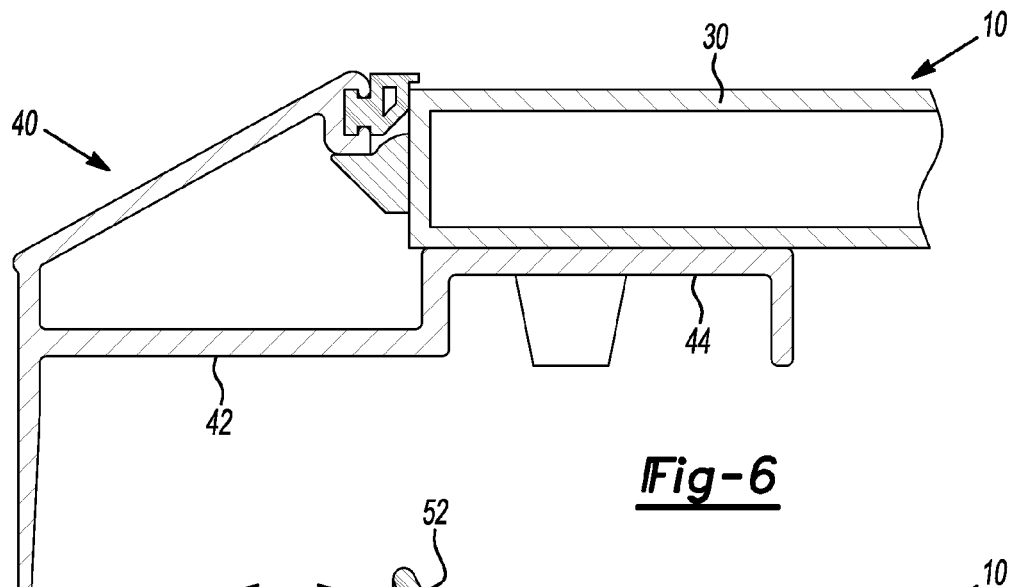
_Fig-6_
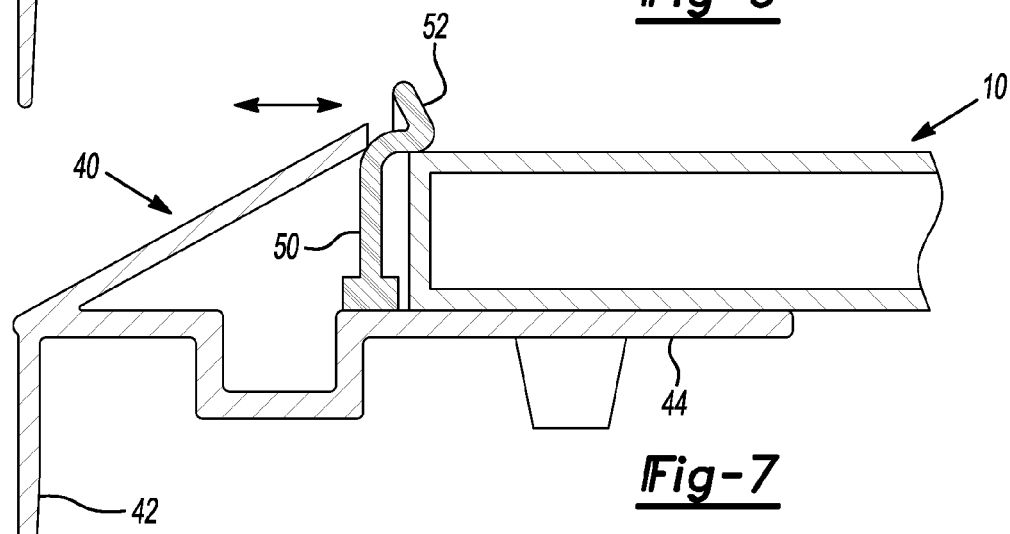
_Fig-7_
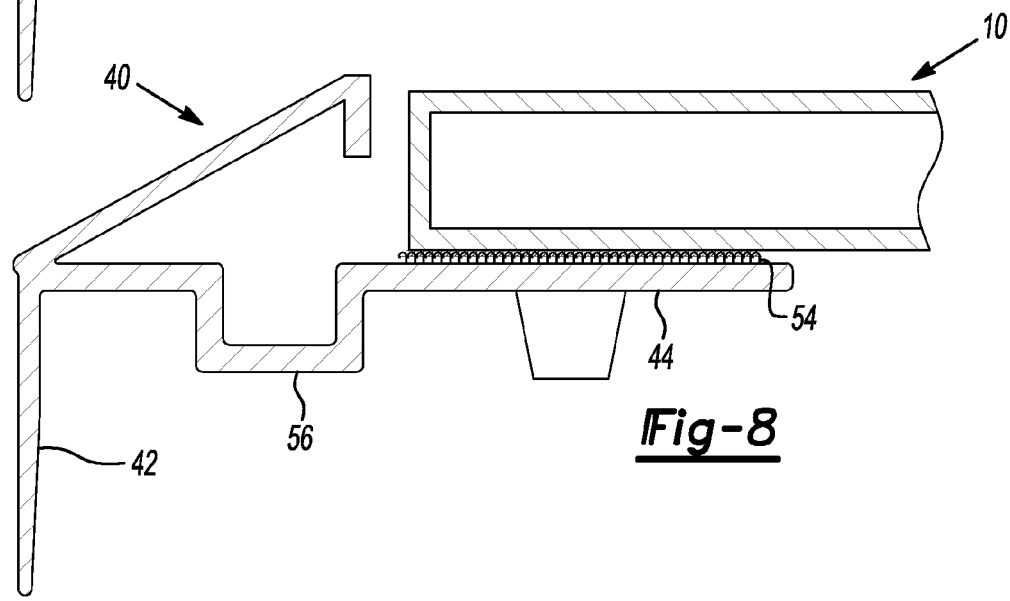
_Fig-8_

HARD ROLL-UP TONNEAU

CROSS-REFERENCE TO RELATED APPLICATIONS

This application claims the benefit of U.S. Provisional Application No. 61/547,099, filed on Oct. 14, 2011. The entire disclosure of the above application is incorporated herein by reference.

FIELD

The present disclosure relates to storage systems for vehicles. More particularly, the present disclosure relates to a hard roll-up type tonneau cover system.

BACKGROUND

This section provides background information related to the present disclosure which is not necessarily prior art.

Pickups are a quite popular type of vehicle because the pickups enable objects of various sizes to be placed in the bed of the pickup and then transported. The bed of the pickup generally has a floor surface that is bounded by a front wall, side walls and a back wall. At least one of the front wall, the side walls and the back wall may be movable to facilitate placing objects into the bed and removing objects from the bed.

Covers are often used to enclose the bed of the pickup to conceal or otherwise protect the contents of the bed. These covers are typically soft tonneau covers that can be removed or folded or are hard bed covers that are generally planar and may be of unitary construction or are segmented to be stacked in a bi or tri-fold type configuration. These covers can be positioned in an extended position generally covering the bed or in a stowed position generally exposing at least a portion of the bed.

In many circumstances, a hard-type tonneau cover is preferred in order to provide additional protection and/or concealment of the bed that is not afforded by soft tonneau cover designs.

Therefore, there exists a need to provide a hard tonneau cover that is capable of providing sufficient protection to the bed and/or its contents. Moreover, there exists a need to provide a hard tonneau cover this is more easily configured into a stowed position, such as through a roll-up design.

SUMMARY

This section provides a general summary of the disclosure, and is not a comprehensive disclosure of its full scope or all of its features.

According to the principles of the present teachings, a tonneau system for a pickup bed is provided having a bracket system connectable with a sidewall of the pickup bed and a plurality of hingeable sections pivotally coupled to each other to define a continuous surface. Each of the plurality of hingeable sections being connected to adjacent hingeable sections to permit at least some of the plurality of hingeable sections to be rolled together into a generally circular cross-section to selectively reveal the pickup bed.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5A is a perspective view of the plurality of hingeable sections in an extended or closed position according to some embodiments having arcuate members;

FIG. 5B is a perspective view of the plurality of hingeable sections in an extended or closed position according to some embodiments having an idler member;

FIG. 5C is a perspective view of the plurality of hingeable sections in an extended or closed position according to some embodiments having a flexible hinge member;

FIG. 5D is a perspective view of the plurality of hingeable sections in an extended or closed position according to some embodiments having arcuate members;

FIG. 5E is a perspective view of the plurality of hingeable sections in an extended or closed position according to some embodiments having a flexible hinge member and nested V-shaped sections;

FIG. 5F is a side view of the plurality of hingeable sections in an extended or closed position according to some embodiments having a flexible hinge member and nested V-shaped sections;

FIG. 5G is a side view of the plurality of hingeable sections in an extended or closed position according to some embodiments having a flexible hinge member and nested V-shaped sections without an optional low surface portion;

FIG. 5H is a top perspective view of the plurality of hingeable sections in an extended or closed position according to some embodiments having cross-vehicle slat members in narrow and wide widths;

FIG. 6 is a partial cross-sectional view illustrating the mounting bracket according to some embodiments of the present teachings;

FIG. 7 is a partial cross-sectional view illustrating the mounting bracket according to some embodiments of the present teachings employing a flexible member; and FIG. 8 is a partial cross-sectional view illustrating the mounting bracket according to some embodiments of the present teachings employing a fastening system.

DETAILED DESCRIPTION

Figure 1:
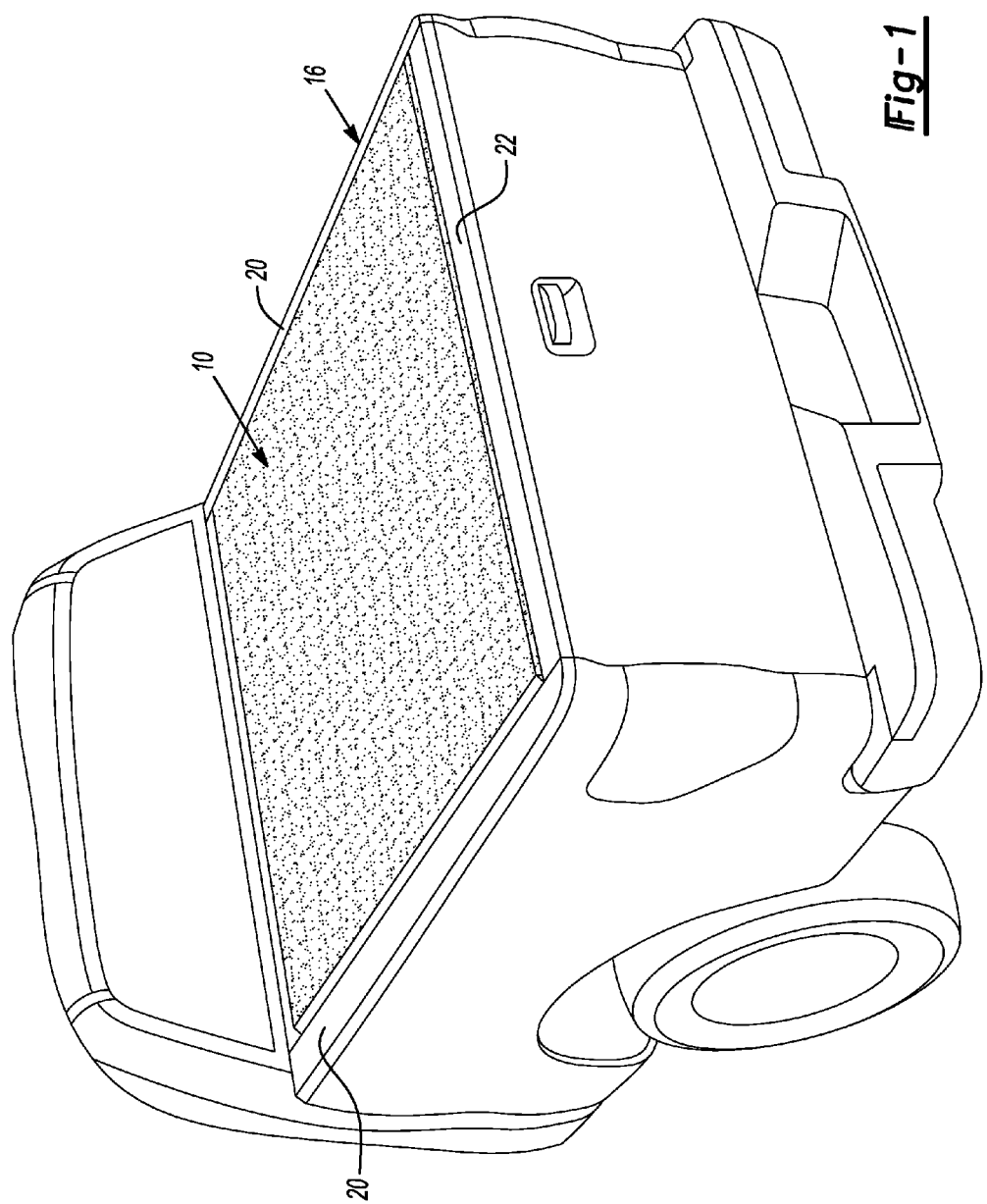
FIG. 1 is a perspective view of a pickup bed of a truck having a hard roll-up tonneau system according to the present teachings in an extended position.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
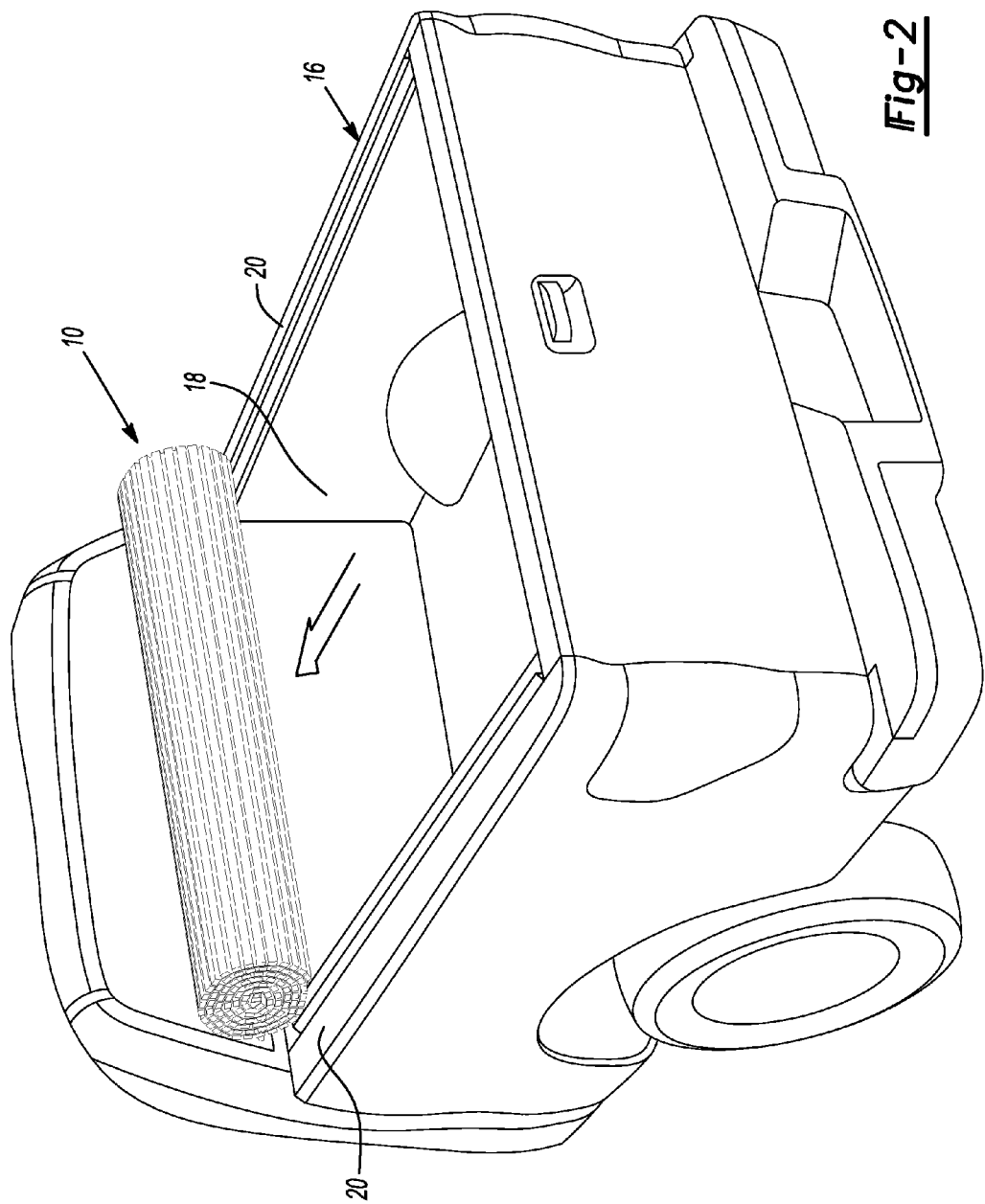
FIG. 2 is a perspective view of a pickup bed of a truck having the hard roll-up tonneau system according to the present teachings in a stowed position near the front wall of the pickup bed.
Figure 3:
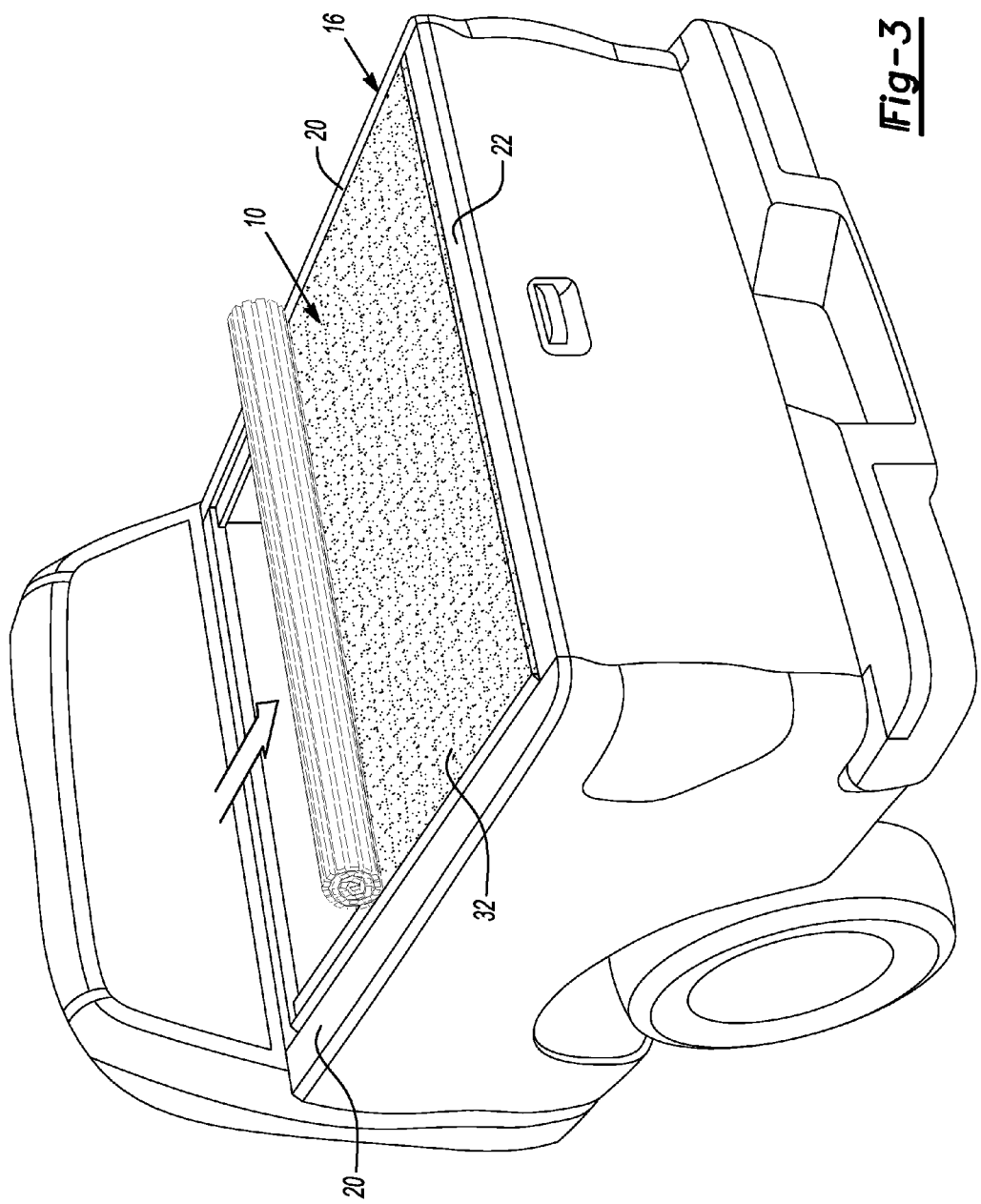
FIG. 3 is a perspective view of a pickup bed of a truck having the hard roll-up tonneau system according to the present teachings in a partially stowed position retraced from the front wall of the pickup bed.

An embodiment of the invention is directed to a hard roll-up tonneau, as illustrated at 10 in the figures. The hard roll-up tonneau system 10 enables pickup bed 16 to be selectively concealed or revealed based on the positioning of hard roll-up tonneau system 10 relative to pickup bed 16, as illustrated in FIGS. 1-3. The hard roll-up tonneau system 10 thereby is particularly well-suited for applications regarding the integrity of a hard tonneau cover and also the convenience and simplicity of a roll-up design.

Briefly, pickup bed 16 can comprise a plurality of sidewalls, namely a front wall 18, a pair of sidewalls 20, and a rear wall or tailgate 22. These walls extend vertically from a bottom surface 24. Traditionally, walls 18, 20, 22 generally extend to a common height above bottom surface 24.

In some embodiments, hard roll-up tonneau system 10 can comprise a plurality of hingeable sections 30 that are interlockingly coupled to adjacent hingeable sections 30 to provide a pivotable connection therebetween. In some embodiments, hingeable sections 30 are made of an interlocking aluminum extrusion that can be adhered or otherwise coupled to a covering material 32. In some embodiments, the covering material can be made of vinyl and can be continuous along the plurality of hingeable sections 30, thereby forming a continuous sheet. In some embodiments, each of the plurality of hingeable sections 30 can comprise a living hinge or rotating section 60 (hinge section 60) formed thereon.

In some embodiments, as illustrated in FIGS. 5A and 5D, hinge section 60 can comprise a pair of nested arcuate sections interlocking adjacent hingeable sections 30 to provide a pivotal connection therebetween. More particularly, each hingeable section 30 can comprise a first arcuate arm 62 downwardly extending from a first end 64 of a planar section 65. Planar section 65 can form a top surface of hard roll-up tonneau system 10 or may include cover member 32 disposed therealong. First arcuate arm 62 can extend from first end 64 downwardly toward the pickup bed 16 and can form an inwardly turned hook-like portion. First arcuate arm 62 can extend to a position generally aligned with a 6 o'clock relative position (FIG. 5A) or a 3 o'clock relative position (FIG. 5D).

In some embodiments as illustrated in FIG. 5A, first arcuate arm 62 can be slideably received within a complementary shaped receiving slot 66 extending from a second end 68 of an adjacent hingeable section 30. Receiving slot 66 can comprise an arcuate channel section 70 formed by a second arcuate arm 72 downwardly extending toward pickup bed 16. Unlike first arcuate arm 62 that is curved generally toward a midpoint section of planar section 65, second arcuate arm 72 can be curved generally away from the midpoint section of planar section 65. In this way, as illustrated in FIG. 5A, second arcuate arm 72 can be generally aligned along a common rotational axis with first arcuate arm 62 of the adjacent hingeable section 30. Receiving slot 66 can further comprise an end section 74 interconnection an end of second arcuate arm 72 to a third arcuate arm 76. Third arcuate arm 76 can be shaped relative to second arcuate arm 72 to define a common axis (co-axial) and spaced apart therefrom to slideably receive first arcuate arm 62 within arcuate channel section 70 formed between second arcuate arm 72 and third arcuate arm

Figure 4:
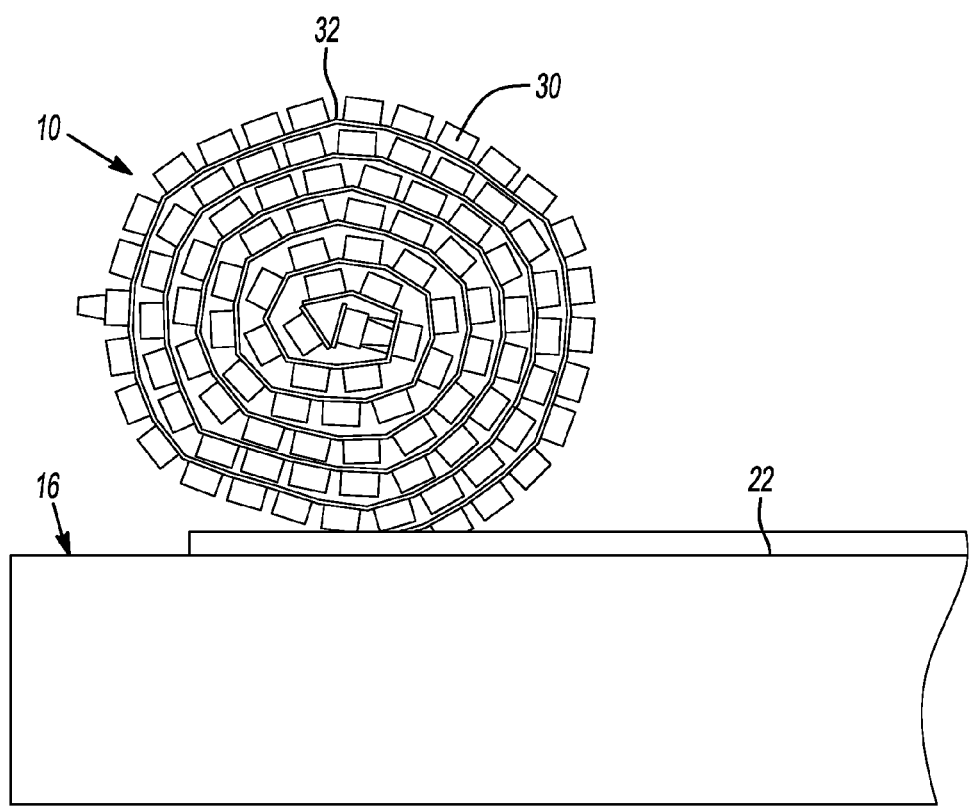
FIG. 4 is a side view of a pickup bed of a truck having the hard roll-up tonneau system according to the present teachings in a stowed position.

76. In this way, each of the plurality of hingeable sections 30 can be articulated or pivoted relative to adjacent hingeable sections 30 to permit hard roll-up tonneau system 10 to be rolled up as illustrated in FIGS. 2-4. Each of the plurality of hingeable sections 30 can be extruded. It should be understood that in some embodiments, hinge section 60 can be a living hinge being integrally made as a unitary member.

However, in some embodiments as illustrated in FIG. 5D, first arcuate arm 62 can be nested with a complementary shaped arcuate arm 63. Arcuate arm 63 can substantially downwardly extend from second end 68 of planar section 65. Second arcuate arm 63 can extend from second end 68 downwardly toward the pickup bed 16 and can form an inwardly turned hook-like portion. Second arcuate arm 63 can extend to a position generally aligned with a 3 o'clock or greater relative position (FIG. 5D). In this way, cover 32, extending along planar sections 65 can serve as the hinge member, permitting articulation and movement of adjacent hingeable sections 30.

In some embodiments, as illustrated in FIG. 5B, hinge section 60 can comprise a pair of opposing arcuate sections disposed in mirrored relationship having an interlocking idler member connected to each of the pair of opposing arcuate sections of adjacent hingeable sections 30 to provide a pivotal connection therebetween. More particularly, each hingeable section 30 can comprise a downwardly extending leg 80 downwardly extending from first end 64 of planar section 65. Planar section 65 can form a top surface of hard roll-up tonneau system 10. Downwardly extending leg 80 can terminate at a distal end to form a first arcuate section 82. In some embodiments, first arcuate section 82 can be generally C-shaped in cross-section and extend along at least a portion of first end 64 of planar section 65. It should be appreciated that first arcuate section 82 can also be formed of a continuous cylindrical member; however, there exist economies in reduced materials and weight when using a C-shaped or other hollow configuration thereof. A corresponding second arcuate section 84 is disposed on an opposing side of each hingeable section 30 at a distal end of a downwardly extending leg 86 downwardly extending from second end 68. Second arcuate section 84 is in mirrored relationship and axially parallel to first arcuate section 82.

First arcuate section 82 and second arcuate section 84 can each extend from downwardly extending legs 80, 86 downwardly toward the pickup bed 16 and can form a generally cylindrical exterior surface 88 thereof.

First arcuate section 82 and second arcuate section 84 can each be received within complementary sized cylindrical channels 90 formed in an idler member 92. Idler member 92 can comprise channels 90 being spaced apart in mirrored relationship and joined together by an intermediate portion 94 integrally formed therewith. Idler member 92 and cylindrical channels 90 are sized, both in terms of inner diameter and axial offset, to permit the rotational movement of hingeable sections 30 relative to each other. In this way, a first hingeable section 30 can articulate or pivot relative to an adjacent hingeable section 30 to achieve the rolled configuration of the present teachings. Specifically, in operation, each of the first and second arcuate sections 82, 84 are operable to rotate within the corresponding cylindrical channel 90 of idler member 92.

In some embodiments, as illustrated in FIG. 5C, hinge section 60 can comprise a pair of opposing channel sections disposed in mirrored relationship having an interlocking flexible member connected to each of the pair of opposing channel sections of adjacent hingeable sections 30 to provide a pivotal connection therebetween. More particularly, each hingeable section 30 can comprise a first cylindrical channel section 102 disposed on an underside surface of planar section 65 at a first end 64. Planar section 65 can form a top surface of hard roll-up tonneau system 10. In some embodiments, first cylindrical channel section 102 can be generally C-shaped in cross-section and extend along at least a portion of first end 64 of planar section 65. A corresponding second cylindrical channel section 104 is disposed on an opposing underside surface of planar section 65 at second end 68. Second cylindrical channel section 104 is in mirrored relationship and axially parallel to first cylindrical channel 102.

First cylindrical channel section 102 and second cylindrical channel section 104 can each receive a complementary sized cylindrical member 106 of a flexible hinge member 108. Flexible hinge member 108 can comprise cylindrical members 106 being spaced apart in mirrored relationship and joined together by an intermediate portion 110 integrally formed therewith. Flexible hinge member 108 and cylindrical channels 102, 104 are sized, both in terms of corresponding inner/outer diameter and axial offset, to permit the rotational movement of hingeable sections 30 relative to each other. Moreover, flexible hinge member 108 is flexible to permit the elastic deformation of flexible hinge member 108 through the full range of relative articulation of hingeable sections 30 without plastic deformation or damage. Intermediate portion 110 of flexible hinge member 108 can further be shaped such that a top surface thereof is generally coplanar with the top surface of adjacent hingeable sections 30 to define a generally continuous planar surface across all sections 30 and flexible hinge members 108. Accordingly, a first hingeable section 30 can articulate or pivot relative to an adjacent hingeable section 30 to achieve the rolled configuration of the present teachings.

Still referring to FIG. 5C, it should also be noted that in some embodiments first cylindrical channel section 102 and second cylindrical channel section 104 can each comprise a downwardly extending leg 112, 114, respectively. Legs 112, 114 can terminate at a foot member 116, 118, respectively. In some embodiments, legs 112, 114 can be angled or other inclined; however, in some embodiments, legs 112, 114 can be substantially parallel and/or converging when tonneau system 10 is in a closed position (generally planar). A leg 120 downwardly extending from flexible hinge member 108 can extend between legs 112, 114 to provide a cushioning, sealing, or otherwise multi-layer engagement between legs 112, 114 and 120. In some embodiments, leg 120 can be made of the same material as flexible hinge member 108 and integrally formed therewith.

Figure 5I:
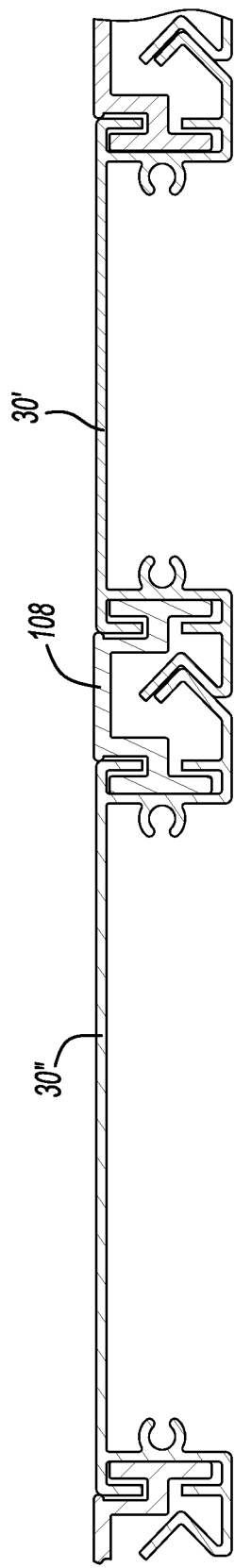
FIG. 5I is a side view of the plurality of hingeable sections in an extended or closed position according to some embodiments having cross-vehicle slat members in narrow and wide widths.

With particular reference to FIGS. 5E-5K and similar to FIG. 5C, in some embodiments, hinge section 60 can comprise a pair of opposing channel sections disposed in mirrored relationship having an interlocking flexible member connected to each of the pair of opposing channel sections of adjacent hingeable sections 30 to provide a pivotal connection therebetween. More particularly, each hingeable section 30 can comprise a first channel section 102 disposed generally along a sidewall region of planar section 65 at a first end 64. A corresponding second channel section 104 is disposed generally along a sidewall region on an opposing sidewall region of planar section 65 at second end 68. Second channel section 104 is in mirrored relationship and parallel to first channel section 102. In some embodiments, channel sections 102, 104 can be generally C-shaped and rectangular in cross-section and extend along at least a portion of first end 64 and second end 68, respectively, of planar section 65. However, it should be understood that alternative cross-sectional shapes can be used. Planar section 65 can form a top surface of hard roll-up tonneau system 10. In some embodiments, planar section 65 can be covered by cover 32.

First channel section 102 and second channel section 104 can each receive a complementary sized member 106 of a flexible hinge member 108. Flexible hinge member 108 can comprise members 106 being spaced apart in mirrored relationship and joined together by an intermediate portion 110 integrally formed therewith. Unlike other embodiments that permit relative rotation of flexible hinge member 108 and channels 102, 104, in the present embodiment, flexible hinge member 108 and channels 102, 104 can be sized, both in terms of corresponding dimensions, to generally inhibit relative movement within channels 102, 104. However, flexible hinge member 108 can be shaped and/or include material properties to permit elastic deformation thereof, without suffering from plastic deformation. To this end, rubber-like materials can be selected or wall thicknesses can be managed to encourage flexible hinge member 108 to act as a living hinge.

Intermediate portion 110 of flexible hinge member 108 can further be shaped such that a top surface thereof is generally coplanar with the top surface of adjacent hingeable sections 30 to define a generally continuous planar surface across all hingeable sections 30 and flexible hinge members 108. Accordingly, a first hingeable section 30 can articulate or pivot relative to an adjacent hingeable section 30 to achieve the rolled configuration of the present teachings.

Still referring to FIGS. 5E-5K, it should also be noted that in some embodiments first channel section 102 and second channel section 104 (or other portion of hingeable section 30) can each comprise a horizontally extending leg 112, 114, respectively. Legs 112, 114 can terminate at a V-shaped section 113, 115, respectively. In some embodiments, V-shaped sections 113, 115 are complementary sized to permit a nested joining of such sections. In this way, an apex of each of the V-shaped sections 113, 115 join together to provide alignment of adjacent hingeable sections 30. Moreover, the nesting of V-shaped sections 113, 115 further provides structure reinforcement of hingeable sections 30 to generally prevent and/or minimize the amount of loading forces having to be carried by flexible hinge member 108. That is, V-shaped sections 113, 115 is capable of carrying, at least in part, vertical, horizontal, and torsional forces. In some embodiments, V-shaped sections 113, 115 can be generally positioned generally below upper planar surface 65 and an optional lower planar surface 67, such that V-shaped sections 113, 115 are generally hidden from view when tonneau system 10 is in the closed position. It should be understood that in embodiments not employing a lower planar surface 67 (see FIG. 5G), V-shaped sections 113, 115 can still be positioned below upper planar surface 65 and above an imaginary plane defined by a lowermost portion of hingeable sections 30.

In some embodiments, as illustrated in FIGS. 5H-5K, upper planar surface 65 can comprise slat members 30 extending cross-vehicle. Slat members can be integrally formed with hingeable section 30 (and thus the term "slat member" may be used interchangeably with hingeable section 30) or, alternatively, can be otherwise captured within a portion of hingeable section 30 (e.g. having cross-supports and slots to receive the slat members). In some embodiments, a width of the slat members, such as in a direction parallel to a vehicle longitudinal direction, can vary to permit a smaller overall diameter when tonneau system 10 is rolled up. That is, by using slat members having a smaller width 30', as seen in FIGS. 5H-5K, a tighter overall cylinder can be formed when tonneau system 10 is in a rolled configuration as the narrower width slats will permit greater articulation and more closely approximate the cross-sectional shape of a cylinder. However, in some embodiments, the narrower slats can be disposed near a rearward section relative to the vehicle of tonneau system 10 and wider slats can be disposed near a forward section relative to the vehicle. In this way, as an operator begins rolling up tonneau system 10 from the rear of the vehicle, the narrower slats will permit a tighter and more compact cylinder. However, as rolling of tonneau system 10 continues toward the forward section of the vehicle or truck bed, the diameter of the rolled-up portion of tonneau system 10 will increase, thereby permitting the use wider slat members 30". In this way, the overall diameter of the rolled-up portion of tonneau system 10 can be minimized and the total number of slats and the associated aluminum can also be minimized, thereby resulting in a lighter and less expensive system. In some embodiments, the wider slat member can define a width of 3.25" and the narrow slat member can define a width of 2.25".

Figure 5J:
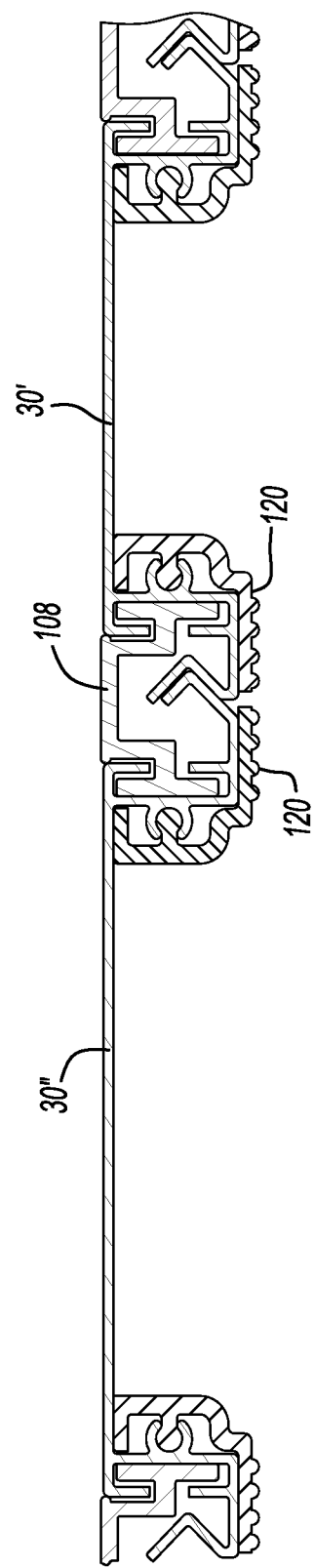
FIG. 5J is a side view of the plurality of hingeable sections in an extended or closed position according to some embodiments having a thermal barrier.
Figure 5K:
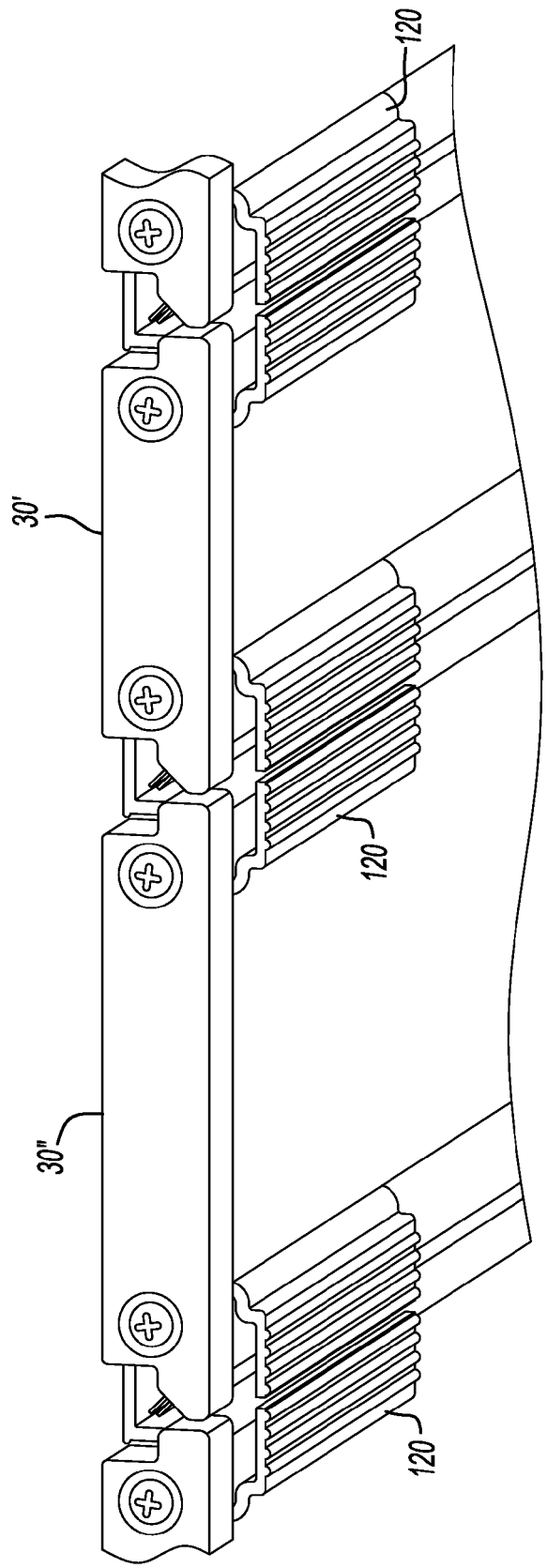
FIG. 5K is a bottom perspective view of the plurality of hingeable sections in an extended or closed position according to some embodiments having a thermal barrier.

Finally, in some embodiments, as illustrated in FIGS. 5J and 5K, extruded hand-hold strips 120 can be disposed along portions of hingeable sections 30 to provide a heat barrier when rolling tonneau system 10.

In some embodiments, hard roll-up tonneau system 10 can comprise a bracket system 40 for mounting to any one or more walls 18, 20, 22. In some embodiments, bracket system 40 can be mounted to sidewalls 20 to provide spanwise support of the plurality of hingeable sections 30. More particularly, in some embodiments, bracket system 40 can be mounted to the top portion of sidewalls 20 to provide additional structural integrity. That is, by mounting bracket system 40 upon a top surface of sidewalls 20, the loading forces placed on the plurality of hingeable sections 30 can be more readily transferred to sidewalls 20 and then to the vehicle body. In this way, heavy items, such as lumber, boxes, all-terrain vehicles, and the like, can be supported on top of the hard roll-up tonneau system 10.

In some embodiments, however, bracket system 40 can be mounted such that it is disposed at a position lower than the top of walls 18, 20, 22. In this way, the top surface of hard roll-up tonneau system 10, namely the plurality of hingeable sections 30 or coverable and/or covering material 32, is generally planar with the top surface of walls 18, 20, 22. To this end, bracket system 40, as illustrated in FIGS. 6-8, can comprise a support portion 42 that couples to walls 18, 20, and/or 22 and provides a support surface 44. The plurality of hingeable sections 30 can be retains to support surface 44, or other portion of bracket system 40, via any one or more of systems. For example, in some embodiments, as illustrated in FIG. 7, a flexible retaining member 50 having an enlarged head portion 52 can extend above and retain the plurality of hingeable sections 30. In some embodiments, a releasable member, such as a hook and loop fastening system and/or magnetic fastening system, 54 can be disposed between support surface 44 and the plurality of hingeable sections 30. Bracket system 40 can comprise a water drain 56 feature extending there along for management of water and other liquids.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tonneau system for a pickup bed, said tonneau system comprising:
   a side rail connectable with a sidewall of the pickup bed; and
   a plurality of hingeable members being pivotally coupled to each other to define a continuous surface supported by said side rail, said plurality of hingeable members being joined together and positionable in a retracted position such that at least a portion of said plurality of hingeable members is rolled together into a generally circular cross-section to reveal the pickup bed, said generally circular cross-section being disposed substantially above said side rail, at least one of said plurality of hingeable members being selectively coupled to said side rail,
   wherein a first of said plurality of hingeable members is hingedly coupled to a second of said plurality of hingeable members via a hinge member, said hinge member having a first arcuate arm extending from said first of said plurality of hingeable members and an arcuate channel extending from said second of said plurality of hingeable members, said arcuate channel receiving said first arcuate arm therein to provide rotational movement between said first of said plurality of hingeable members and said second of said plurality of hingeable members.

2. The tonneau system according to claim 1, further comprising:
   a cover member spanning said plurality of hingeable members.

3. The tonneau system according to claim 1 wherein said side rail is mountable to a top surface of the sidewall of the pickup bed such that a lower surface of said plurality of hingeable members extends along the top surface of the sidewall.

4. The tonneau system according to claim 1 wherein a first of said plurality of hingeable members is hingedly coupled to a second of said plurality of hingeable members via a hinge member, said hinge member being a living hinge.

5. A tonneau system for a pickup bed, said tonneau system comprising:
   a side rail connectable with a sidewall of the pickup bed; and
   a plurality of hingeable members being pivotally coupled to each other to define a continuous surface supported by said side rail, said plurality of hingeable members being joined together and positionable in a retracted position such that at least a portion of said plurality of hingeable members is rolled together into a generally circular cross-section to reveal the pickup bed, said generally circular cross-section being disposed substantially above said side rail, at least one of said plurality of hingeable members being selectively coupled to said side rail,
   wherein a first of said plurality of hingeable members defines a width along a pickup bed longitudinal direction that is narrower than a width of a second of said plurality of hingeable members, said first of the plurality of hingeable members is disposed more rearward along said pickup bed longitudinal direction than said second of said plurality of hingeable members.

* * * * *